Patented June 6, 1950

2,510,503

UNITED STATES PATENT OFFICE 2,510,503

POLYMERS AND COPOLYMERS OF UNSATURATED TRIAZINES

Edward L. Kropa, Old Greenwich, Conn., assignor to American Cyanamid Company, New York, N. Y., a corporation of Maine No Drawing. Application October 2, 1946, Serial No. 700,833

24 Claims. (Cl. 260—45.4)

This application is a continuation-in-part of my copending applications Serial No. 540,142, filed June 13, 1944, now Patent No. 2,443,740, Serial No. 555,194, filed September 21, 1944, now Patent No. 2,443,741, Serial No. 616,648, filed September 15, 1945 and Serial No. 653,959, filed March 12, 1946, now Patent No. 2,485,294, Oct. 18, 1949.

This invention relates to the production of new materials having valuable and characteristic properties that make them especially suitable for use in industry, for example in molding, casting, coating, electrically insulating, and adhesive applications, and for other purposes. More particularly the invention is concerned with compositions of matter comprising the product of polymerization of a polymerizable mass including a compound represented by the general formula

I

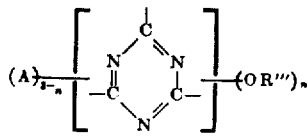

where A represents a monovalent radical selected from the class consisting of (a) monovalent saturated aliphatic, aromatic and nuclearly halogenated aromatic hydrocarbon radicals, (b) amino radicals represented by the formula —NRR' where R and R' each represents a member of the class consisting of hydrogen, monovalent saturated aliphatic hydrocarbon radicals and monovalent aromatic and nuclearly halogenated aromatic hydrocarbon radicals and (c) radicals represented by the formula —OR" where R" has the same meaning as R and R', R'" represents a monovalent radical which is the residue of a primary, ethylenically unsaturated monohydric alcohol containing at least 3 and not more than 10 carbon atoms, and $n$ represents an integer which is at least 1 and not more than 3. From a consideration of the above formula it will be seen that when $n$ is 3 there will be no radicals represented by A attached to the triazine nucleus.

Illustrative examples of monovalent hydrocarbon radicals which R and R' in the above formula may represent are: saturated aliphatic (e. g., methyl, ethyl, propyl, isopropyl, butyl, isobutyl, sec.-butyl, amyl, isoamyl, hexyl, octyl, decyl, dodecyl, octadecyl, etc.), including saturated cycloaliphatic (e. g., cyclopentyl, cyclohexyl, cycloheptyl, etc.) and aromatic-substituted saturated aliphatic (e. g., benzyl, phenylethyl, phenylpropyl, phenylisopropyl, etc.); aromatic (e. g., phenyl, biphenylyl, naphthyl, etc.), including saturated aliphatic-substituted aromatic (e. g., tolyl, xylyl, ethylphenyl, propylphenyl, isopropylphenyl, butylphenyl, etc.); and nuclearly halogenated aromatic (e. g., chlorophenyl, bromophenyl, fluorophenyl, dichlorophenyl, trichlorophenyl, chlorobiphenylyl, chlorotolyl, iodotolyl, bromotolyl, chloroxylyl, ethyl chlorophenyl, propyl bromophenyl, etc.). Illustrative examples of monovalent radicals which R'" in the above formula may represent are allyl, methallyl, ethallyl, propallyl, 2-butenyl, 3-butenyl, 3-methyl-2-butenyl, 3 - methyl - 3 - butenyl, 2 - pentenyl, 3-pentenyl, 4-pentenyl, 2-methyl-2-pentenyl, 3-methyl-4-pentenyl, 2-hexenyl, 2,3-pentadienyl, 2,4-hexadienyl, 2-octenyl, 3-nonenyl, 2-decenyl, etc.

Examples of compounds embraced by Formula I are triallyl cyanurate, 2-amino-4,6-dialloxy-1,3,5-triazine, 2-alloxy-4,6-diamino-1,3,5-triazine, 2-butylamino-4,6-dimethalloxy-1,3,5-triazine, tricrotyl cyanurate, trimethallyl cyanurate, diallyl methallyl cyanurate, etc.

A method of preparing the compounds embraced by Formula I, most if not all of which are believed to be new chemical compounds, is more fully described and specifically claimed in the copending application of James R. Dudley, Serial No. 700,840, filed concurrently herewith. Chemical compounds represented by the general formula

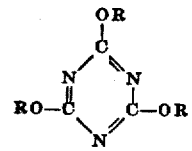

where R represents a monovalent ethylenically unsaturated aliphatic hydrocarbon radical containing at least 3 and not more than 4 carbon atoms, specifically triallyl cyanurate, are disclosed and triallyl cyanurate specifically is claimed in the copending application of James R. Dudley, Serial No. 700,839, also filed concurrently herewith.

Also within the scope of the present invention are polymerizable compositions comprising (1) a compound of the kind embraced by Formula I and (2) an unsaturated material which is different from the compound of (1) and which is copolymerizable therewith; as well as products comprising the polymerized composition. The unsaturated material which is incorporated in such polymerizable compositions may be a compound containing a $CH_2=C<$ grouping which is different from the compounds embraced by Formula I, e. g., styrene, methyl acrylate, methyl methacrylate, vinyl acetate, diallyl phthalate, etc.; a polymerizable unsaturated alkyd resin, e. g., ethylene glycol maleate, ethylene glycol fumarate, triethylene glycol itaconate, diethylene glycol maleate phthalate, diethylene glycol fumarate sebacate, etc.; a polymerizable polyalkyl ester of an unsaturated alpha, beta-polycarboxylic acid of the aliphatic series, more particularly a polyalkyl ester of an alpha, beta-unsaturated polycarboxylic acid, e. g., dimethyl fumarate, diethyl fumarate, diethyl maleate, dipropyl itaconate, tributyl aconitate, etc.; or mixtures of any two or all of such monomeric materials. Polymerized products also may be prepared from polymerizable compositions containing such monomeric or partially polymerized or unsaturated materials having incorporated therein a soluble polymer of a compound embraced by Formula I, e. g., a soluble polymer of triallyl cyanurate, 2-amino-4,6-dialloxy-1,3,5-triazine (diallyl ammelide), etc. Triallyl cyanurate is a specific example of a cyanuric triester of a primary, ethylenically unsaturated monohydric alcohol containing at least 3 and not more than 10 carbon atoms, while 2-amino-4,6-dialloxy-1,3,5-triazine is a specific example of an amelide diester of such an alcohol.

One of the objects of this invention is to prepare new and useful resins and especially to obtain clear and colorless gels.

It is also an object of this invention to provide potentially polymerizable molding and other compositions which have good storage stability and which can be handled without difficulty prior to and during fabrication.

Still another object of this invention is to control the rate of polymerization of the reactive mixture, as well as to improve the properties and characteristics of the resulting gels.

Another object of this invention is to prepare synthetic materials which are particularly suitable for use as coating compositions and as components in coating compositions.

A further object of this invention is to prepare molding compositions and especially compositions which are applicable to low pressure laminating techniques wherein the resin can be applied to the fabric in a relatively non-viscous condition and which will not run excessively during the fabrication step. Another object of the invention is to prepare clear and colorless cast articles, as well as laminated moldings having high strength characteristics and other desirable properties.

Another object of this invention is to improve the arc resistance and other electrical characteristics of unsaturated alkyd and other resins, both crystalline and amorphous, and to provide resins which are more flame resistant than the unmodified resin. Other objects will be apparent from the description which follows.

Prior to this invention polymers and copolymers of various monomeric materials containing a $CH_2=C<$ or other polymerizable unsaturated grouping have been prepared. Many of such polymers and copolymers are now in commercial use, their field of utility being generally limited by their particular properties.

The present invention is based on my discovery that polymeric materials produced by polymerizing a compound of the class embraced by Formula I alone or admixed with one or more other monomers of the kind above mentioned, e. g., unsaturated alkyd resins, including crystalline unsaturated alkyd resins, have improved and unobvious properties which render such materials especially valuable in the plastics and coating arts. For example, like the crystalline alkyd resins, methods for the preparation of which are disclosed and claimed in my copending application Serial No. 564,723, filed November 22, 1944, certain of the monomeric materials embraced by Formula I are solids, thus enabling them to be used in molding and other applications where a liquid monomer would be difficult to handle. The advantages of such polymerizable compositions, that is, compositions which are normally solid and substantially non-tacky, and the disadvantages of the prior materials, are set forth at length in my copending application Serial No. 616,648, filed September 15, 1945 with particular reference to compositions comprising a crystalline unsaturated alkyd resin and a polymerizable substance having a $CH_2=C<$ grouping.

A particular advantage that accrues from the use of the compounds embraced by Formula I in making polymeric and copolymeric compositions therefrom is the improved arc resistance which is imparted to the cured compositions into which such triazine compounds are incorporated. Surprisingly, too, the use of such compounds in the production of copolymers generally provides final products of increased hardness as compared with polymers or copolymers similarly made in the absence of the triazine compound. Certain of these triazine compounds, more particularly those of higher nitrogen content, further improve the properties of polymers and copolymers produced therefrom by imparting flame resistance thereto.

Substantially insoluble, substantially infusible resins may be prepared by means of the chemical reaction or polymerization of a mixture containing a resin possessing a plurality of polymerizably reactive alpha, beta enal groups

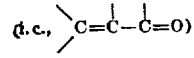

and a triazine derivative of the kind embraced by Formula I which contains a $CH_2=C<$ grouping, more particularly the polymerizably reactive grouping $CH_2=CH-CH_2-$, or a plurality of such groupings. Such mixtures may be utilized in coating compositions, in molding compositions, in laminating compositions, in adhesives, in casting compositions, etc.

The organic substances embraced by Formula I, many of which contain the polymerizably reactive grouping $CH_2=C<$, more particularly the grouping $CH_2=CHCH_2-$, are reactive materials and are thus frequently referred to herein. They are distinguished from the resins which possess a plurality of polymerizably reactive alpha, beta enal groups and which are designated herein as "reactive resins" or as "unsaturated alkyd resins."

Some of the reactive materials embraced by Formula I and which contain a $CH_2=C<$ grouping are solvents, and therefore the reactive resins may be dissolved therein to form liquid compositions which may be used as such without the addition of any other solvent unless particularly desirable. It is to be understood, however, that I am not restricted to liquid substances which actually act as solvents, since in some cases the organic liquid substances may in fact act as a solute rather than as a solvent, it being dissolved by the resin, or a colloidal dispersion may be produced instead of a true solution.

Among the reactive resins used in the practice of this invention for interaction with the reactive material of Formula I are those which are derived from unsaturated alpha, beta-organic acids of the aliphatic series and, therefore, contain the reactive groupings present in these acids. The term "acids" as used herein is intended to include the anhydrides as well as the acids themselves since the former may be used instead of the acid. The terms "unsaturated alpha,beta-organic acid" and "alpha, beta-unsaturated organic acid" as commonly used in the art do not include acids wherein the unsaturated group is part of an aromatic-acting radical, as for example, phthalic acid, and the same definition is adopted herein.

The resins are preferably produced by the esterification of an unsaturated alpha,beta-polycarboxylic acid of the aliphatic series, more particularly an alpha, beta-unsaturated polycarboxylic acid, with a polyhydric alcohol and particularly a glycol. Although esterification of the acid with a polyhydric alcohol is perhaps one of the simplest, most convenient ways of obtaining a reactive resin, I am not precluded from using resins otherwise derived from unsaturated alpha, beta-organic acids. I also may employ a crystalline unsaturated alkyd resin obtained by the reaction of a glycol, which is completely symmetrical, with an alpha,beta-unsaturated dicarboxylic acid having a transfiguration such as fumaric acid. Reactive resins suitable for my invention are any of those containing a plurality of polymerizably reactive alpha, beta enal groups.

A reactive resin such as those prepared by the esterification of alpha,beta-unsaturated organic acids and a glycol or other polyhydric alcohol as illustrated above may be mixed with the reactive material comprising a compound of the kind embraced by Formula I. Upon adding a polymerization catalyst and subjecting the mixture to polymerization conditions such as, for example, heat, light, or a combination of both, a substantially insoluble, substantially infusible resin is obtained.

Triallyl cyanurate, trimethallyl cyanurate, 2-amino-4,6-dialloxy-1,3,5-triazine or other compound of the kind embraced by Formula I may be polymerized alone or with each other, or with a polymerizable unsaturated alkyd resin, or with other monomeric materials copolymerizable therewith and containing a $CH_2=C<$ grouping, or mixtures of all three types of materials may be polymerized in preparing the new synthetic compositions of this invention.

Illustrative examples of monomeric materials that may be copolymerized with compounds of the kind embraced by Formula I in the presence or absence of a polymerizable unsaturated alkyd resin are reactive compounds which contain a $CH_2=C<$ grouping, more particularly a $$CH_2=CH-CH_2-$$

grouping, especially those which have a boiling point of at least about 60° C. Of the monomeric compounds which may be used the allyl esters form a large class, all of which are suitable. The reactive allyl compounds which have been found to be most suitable are those having a high boiling point such as the diallyl esters, e. g., diallyl maleate, diallyl fumarate, diallyl phthalate and diallyl succinate. Other allyl compounds which are not necessarily high boiling also may be used.

More specific examples of allyl compounds that may be copolymerized with triallyl cyanurate or other compound of the kind embraced by Formula I in the presence or absence of a polymerizable unsaturated alkyd resin are: allyl alcohol, methallyl alcohol, allyl acetate, allyl lactate, the allyl ester of alpha-hydroxyisobutyric acid, allyltrichlorosilane, allyl acrylate, allyl methacrylate, diallyl carbonate, diallyl malonate, diallyl oxalate, diallyl succinate, diallyl gluconate, diallyl propanolamine dicarbonate, diallyl methylgluconate, diallyl adipate, the diallyl ester of azelaic acid, diallyl sebacate, diallyl tartronate, diallyl tartrate, diallyl silicate, diallyl fumarate, diallyl maleate, diallyl mesaconate, diallyl citraconate, diallyl gluctaconate, the diallyl ester of muconic acid, diallyl itaconate, diallyl phthalate, diallyl chlorophthalate, diallyldichlorosilane, the diallyl ester of endomethylene tetrahydrophthalic anhydride, triallyl tricarballylate, triallyl aconitate, triallyl citrate, triallyl phosphate, trimethallyl phosphate, tetraallyl silane, hexaallyl disiloxane, etc.

Other examples of allyl compounds that may be employed in practicing my invention are: allyl oxalate, diallyl ethylene glycol dioxalate, diallyl neopentyl glycol dioxalate, triallyl glyceryl trioxalate, diallyl ethylene glycol dicarbonate, diallyl diethylene glycol dicarbonate, diallyl trimethylene glycol dicarbonate, diallyl neopentyl glycol dicarbonate, diallyl glycerol carbonate, triallyl glycerol tricarbonate, tetraallyl pentaerythritol tetracarbonate, tetrallyl alpha, beta-dicarbo tartrate, diethyl alpha,beta-diallyldicarbo tartrate, diallyl ester of ethylene glycol bis(alpha, beta-diallyldicarbo tartrate), diallyl ester of hydroxy aceto-carbonate, diallyl ester of lacto-carbonate, diallyl ester of ethylene glycol disuccinate, diallyl ester of ethylene glycol diadipate, triallyl glyceryl trisuccinate, tetraallyl pentaerythritol tetrasebacate, diallyl bis-lactocarbonate, diallyl ethanolamine dicarbonate, diallyl neopentanolamine dicarbonate, diallyl N-ethanol ethylene diamine dicarbonate, triallyl N-diethanol ethylene diamine tricarbonate, diallyl N-phenyl ethanolamine dicarbonate, triallyl ester of the tricarbonate of diethanolamine, diallyl diglycino carbonate, diallyl di-alpha-amino-propiono carbonate, diallyl di-epsilon-aminocapro carbonate, diallyl glycinoamide, diallyl ester of the dicarbonate of ethylene diamine, diallyl ester of the dicarbonate of n-propylene diamine, diallyl ester of the dicarbonate of p-phenylene diamine, triallyl ester of the tricarbonate of diethylene triamine, the formaldehyde condensation product of the allyl ester of the carbonate of beta-amino-propionamide, the formaldehyde condensation product of the allyl ester of the carbonate of epsilon-amino caproic amide, the formaldehyde condensation product of the allyl ester of axamide and the formaldehyde condensation product of the allyl ester of alpha-carboxy-amino isobutyramide. In my copending applications Serial Nos. 540,142, 555,194, and 616,648, I have given general formulas for most of these compounds and brief descriptions of methods by which they may be prepared.

Still other allyl compounds which may be used for reaction with a polymerizable compound of the kind embraced by Formula I alone or admixed with an unsaturated alkyd resin include diallyl dithioammelide and aldehyde-reaction products thereof, e. g., 2-(N-methylol)-4,6-di-(allylthio)-1,3,5-triazine; allyl thioammeline and aldehyde-reaction products thereof, e. g., 2-allyl-thio-4,6-di-(N-methylol)-1,3,5-triazine; aldehyde-reaction products of diallyl ammelide, e. g., 2-(N-methylol)-4,6-dialloxy-1,3,5-triazine; aldehyde-reaction products of allyl ammeline, e. g., 2-alloxy-4,6-di-(N-methylol)-1,3,5-triazine; allyl carbamate and other unsaturated esters of carbamic acid, as well as other allyl compounds.

Other examples of monomeric materials which may be copolymerized with compounds of the kind embraced by Formula I, alone or admixed with an unsaturated alkyd resin, more particularly a resin obtained by reaction of ingredients comprising a polyhydric alcohol and an ethylenically unsaturated alpha, beta-polycarboxylic acid of the aliphatic series, are the unsaturated alcohol esters, e. g., the allyl, methallyl, crotyl, 1-chloroallyl, 2-chloroallyl, cinnamyl, vinyl, methvinyl, alpha-phenylallyl, propargyl, etc., esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, toluic, phenylacetic, phthalic, terephthalic, benzoylphthalic, etc.; the saturated monohydric alcohol esters, e. g., the methyl, ethyl, propyl, butyl, isobutyl, etc., esters of the unsaturated aliphatic monobasic and polybasic acids, illustrative examples of which appear above; vinyl cyclic compounds, e. g., styrene, chlorostyrenes, dichlorostyrenes, methyl styrenes, dimethyl styrenes, vinyl naphthalene, vinyl cyclohexane, vinyl furane, vinyldibenzofuran, divinyl benzene, etc.; unsaturated ethers, e. g., ethyl vinyl ether, diallyl ether, methallyl ethyl ether, etc.; unsaturated ketones, e. g., methyl vinyl ketone, divinyl ketone, methyl allyl ketone, etc.; methylene malonic esters, e. g., methylene methyl malonate, etc.; butadienes, e. g., 1,3-butadiene, 2-chlorobutadiene, etc. Additional examples of monomeric materials that may be employed in preparing the new copolymers of this invention are given in various copending applications of mine, for instance in my aforementioned application Serial No. 616,648.

Reactive resins which may be copolymerized with a compound of the kind embraced by Formula I alone, or admixed with each other or with other monomeric materials copolymerizable therewith are those which contain a plurality of alpha, beta enal groups. The simplest members of this group are those produced by the esterification of an unsaturated alpha, beta-organic acid, more particularly an alpha, beta-unsaturated organic acid of the aliphatic series, with a polyhydric alcohol.

The preferred polyhydric alcohols are those which contain only primary hydroxyl groups, since the presence of secondary hydroxyl groups may make it difficult to obtain rapid esterification. The glycols are generally preferable. If colorless resins be sought or if optimum electrical properties be desired, it is preferable to use glycols which do not have any oxygen bridges in their structure since the presence of oxygen linkages may lead to the formation of color bodies during the preparation of the resin. By the use of glycols which do not contain the oxygen bridges clear, colorless resins may be produced. On the other hand, oxygen bridges may be desirable if the resin is to be used in coating applications as they cause films to dry faster.

The particular choice of glycol or other polyhydric alcohol used in preparing the resin is governed mainly by the physical properties desired of the intermediate and final polymerization products, especially hardness, impact resistance, distensibility, refractive index, adhesion, compatibility relationships, etc., including also solvent, water, alkali, acid or chemical resistance in general.

The unsaturated alpha, beta-organic acids of the aliphatic series which I prefer to use in preparing the reactive resins include maleic, fumaric, itaconic and citraconic, although other similar acids may be employed, e. g., mesaconic acid, aconitic acid and halogenated maleic acids, e. g., chloromaleic acid, and any of the foregoing could be substituted in part with acrylic, beta-benzoyl acrylic, methacrylic, $\Delta^1$-cyclohexene carboxylic, cinnamic, and crotonic acids. Obviously, various mixtures of these acids can be used where expedient.

The reactive resins may be modified with other substances which are used in alkyd resins, i. e., monohydric alcohols, monobasic acids or dibasic acids, e. g., phthalic acid, chlorinated phthalic acids or anhydrides (e. g., tetrachlorophthalic acid or anhydride, etc.), succinic acid, glutaric acid, adipic acid, azelaic acid, sebacic acid, etc., which do not contain groups polymerizably reactive with respect to other polymerizable monomers, more particularly organic substances containing $CH_2=C<$ groups. These modifying agents are usually used as diluents or plasticizers, chemically combined in the resin. The use of a small proportion of the saturated dibasic acids generally improves the mechanical properties of the resins after copolymerization with, for example, a material containing a $CH_2=C<$ grouping.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the unsaturated alpha, beta-organic acids of the aliphatic series. Consequently, it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated aliphatic compounds. One way of accomplishing this, for example, is by direct esterification of an unsaturated alcohol containing a $CH_2=C<$ grouping. Examples of such alcohols are allyl alcohol, methallyl alcohol, ethallyl alcohol, etc.

While the reactive resins may be modified in the same general manner as other alkyd resins, it is preferable to have at least 20 mol per cent polyhydric alcohol in the reactive mixture and at least 25 mol per cent polybasic acid in said reactive mixture. If a monohydric alcohol or a dibasic acid which does not contain polymerizably active groups with respect to organic substances containing a $CH_2=C<$ grouping be used, the proportion of such substance will depend on the properties required of the polymerized reactive material-reactive resin mixture. By the use of a relatively large proportion of a polymerizably active dibasic acid, e. g., maleic, in the reactive resin, a hard polymer is produced upon subsequent reaction of said reactive resin with a compound of the kind embraced by Formula I alone or combined with a different monomeric material containing a $CH_2=C<$ grouping. On the other hand, if the reactive resin is obtained from a relatively small proportion of polymerizably active dibasic acid and a relatively large proportion of acids which do not contain groups polymerizably active with respect to compounds embraced by Formula I a softer and more rubbery resin may result upon polymerization of the polymerizable mixture. The same effect is produced by the introduction of other inactive ingredients. By varying the ingredients and the proportions of the ingredients, resins may be obtained having properties desirable for almost any particular use.

The unsaturated alkyd resins employed in accordance with my invention are preferably those having an acid number not greater than 50, although in some cases resins having an acid number as high as 100 may be desirable. Generally the acid number should be as low as possible, but this is sometimes controlled by practical considerations of operation such as time, temperature and economy. The term "unsaturated alkyd resin" as used herein and in the appended claims does not include within its meaning the conventional drying oil-modified alkyd resins in the preparation of which an aromatic or saturated aliphatic polycarboxylic acid or anhydride is employed.

The resins should be so formulated that the carboxyl groups of the acids are reacted with the theoretical molal equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha, beta unsaturated polycarboxylic acid, respectively.

When glycols are reacted with dicarboxylic acids it is preferable that the glycol be present in a molal ratio to the acid of not less than 1:2 and that the molal ratio of monohydric alcohol to dicarboxylic acid be not greater than 1:1. In most cases it has been found that a molal ratio of monohydric alcohol to dicarboxylic acid of 1:6 produces the best results (5.5 mols of glycol being employed in this case). The same general rules apply when polyhydric alcohols other than glycols such as pentaerythritol, dipentaerythritol or polyallyl alcohols are used or when other polycarboxylic acids having more than two carboxylic groups are used. In other words, the ratio of the monohydric alcohol to the polycarboxylic acid should preferably be not greater than 1:1 although higher ratios of monohydric alcohol may be employed if desired. However, for optimum results the ratio of monohydric alcohol to polycarboxylic acid should not exceed 1 mol of monohydric alcohol for each carboxyl group of the polycarboxylic acid in excess of 1. Thus, for example, a resin may be prepared by the reaction of 1 mol of dipentaerythritol with 5 mols of fumaric acid and 4 mols of monohydric alcohol.

If it be desirable to introduce lower alkyl groups into the resin, this may be done by using maleic esters of monohydric alcohols, e. g., ethyl maleate. The alkyl ester will then be united with the resin by polymerization. This could not be accomplished with the saturated type of alkyd, e. g., phthalic esters of polyhydric alcohols.

Resins which contain a plurality of alpha, beta enal groups are sensitive to light, heat and polymerization catalysts. Since oxygen tends to cause these resins to polymerize, it is desirable that the resins should be made in the absence of this substance, especially when colorless resins are required. The exclusion of oxygen and polymerization catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

The polymerization of the compounds embraced by Formula I and their copolymerization with unsaturated alkyd resins and other monomeric or partially polymerized materials is preferably accelerated by incorporating a polymerization catalyst into the polymerizable composition. In some cases, and as shown by some of the examples which follow, the catalyst may be omitted.

The polymerization catalysts include the organic superoxides, alcoholic and acidic peroxides. Among the preferred catalysts there are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary-butyl hydroperoxide, usually called tertiary-butyl peroxide and terpene oxides, e. g., ascaridole. Still other polymerization catalysts might be used in some instances, e. g., soluble cobalt salts (particularly the linoleate and naphthenate), p-toluene sulfonic acid, aluminum chloride, stannic chloride and boron trifluoride.

The term "polymerization catalyst" as used in this specification is not intended to cover oxygen contained in the resin as an impurity. While this small amount of oxygen would only catalyze the reaction to a very small extent, in order to eliminate any ambiguity the term "polymerization catalyst" is specifically defined as excluding any oxygen present as an impurity in the resin itself.

The concentration of catalyst employed is usually small, i. e., for the preferred catalysts, from about 1 part catalyst per thousand parts of the material or mixture of materials to be polymerized to about 2 parts per hundred parts of the said material or mixture. If an inhibitor be present, up to 5% or even more by weight of catalyst, based on the weight of the polymerizable composition, may be necessary according to the concentration of inhibitor. Where fillers are used that contain high concentrations of substances which act as inhibitors, e. g., wood flour, the concentration of catalyst necessary to effect polymerization may be well above 5%.

The polymerization conditions referred to are heat, light, or a combination of both. Ultraviolet light is more effective than ordinary light. The temperature of conversion depends somewhat on the boiling point of the reactive material and also on the pressures used. At atmospheric pressure, as in coating and casting operations, temperatures near or above the boiling point are unsuitable in most instances since substantial amounts of the reactive material would be lost by evaporation before the reaction between the resin and reactive material can be completed. Accordingly, a temperature between room temperature (about 20° to 25° C.) and the boiling point is usually employed where polymerization of this nature is carried out. The rate of polymerization doubles for about each ten degrees (C.) rise in temperature for this reaction. A temperature is selected which will give a suitable reaction rate and yet not cause substantial volatilization. Obviously it will be necessary to use lower temperatures if large or very thick pieces are being cast because of the exothermic reaction and poor heat conductivity of the reacting mixture. Where suitable precautions are taken to prevent evaporation of the reactive material or where pressure molding is used higher temperatures than those mentioned above could be used. In most cases the temperature of polymerization or copolymerization will be within the range of 40° to 200° C., usually within the range of 60° to 130° C., depending upon the particular monomer or mixture of monomers employed, the particular catalyst, if any, used, the rapidity of polymerization wanted, and other influencing factors.

The particular triazine derivative embraced by Formula I or mixture thereof with an unsaturated alkyd resin or with another monomeric material or materials, or mixtures thereof, and catalyst if any, are selected according to the type of product desired, taking into account the solubility or compatibility characteristics of the reactants as well as the nature of the resulting gels. In the preparation of two-, three-, four- or higher multicomponent copolymer compositions, the proportions of components may be varied as desired or as conditions may require. For example, in a two-component polymerizable composition the triazine derivative may be as little as about 2 or 3 per cent by weight of the polymerizable mixture or as much as about 97 or 98 per cent by weight thereof. Ordinarily, however, in such a mixture the triazine derivative is employed in an amount ranging from about 10 to 90 per cent by weight of the polymerizable composition, more particularly from about 20 to 80 per cent by weight thereof, the unsaturated alkyd resin (in monomeric or partially polymerized state) or other monomeric or partially polymerized material, or mixture of unsaturated alkyd resin and such other material, constituing the remainder. Some combinations of triazine derivatives and other monomers copolymerizable therewith result in opaque gels, while others give clear products in the gel state. Obviously, for many purposes the opaque gel may be used equally as well as the clear gel.

It may sometimes be desirable to reduce the viscosity of a liquid mixture of an unsaturated alkyd resin and a triazine derivative of the kind embraced by Formula I, as for instance when a very viscous resin is employed in the preparation of such a composition and the composition is to be used in coating applications. This reduction in viscosity may be effected by adding, for instance, an esterification catalyst, e. g., p-toluene sulfonic acid, and then heating the resulting mixture until the viscosity is reduced. The mechanism of this change is probably re-esterification. It it also desirable to add a polymerization inhibitor before the heating or "thinning" process. This procedure also is useful when the polymerizable composition is to be baked at a high temperature, under which conditions some of the volatile components of the composition otherwise might be lost in part by evaporation. If this "thinning" process is carried out, the other monomeric material is combined with the unsaturated alkyd resin by re-esterification and is not lost when the composition is heated at a baking temperature.

In casting or molding or in other applications of some of the polymerizable compositions of this invention, it may sometimes be desirable to body the composition before adding the catalyst in order to reduce the induction period, which otherwise may be too long for the particular application. This may be done, for example, by heating the mixed ingredients at a suitable temperature, e. g., at from about 70° to about 110°, preferably at about 90° C., for a period of time sufficient to reduce substantially the induction period. This time will vary depending upon such influencing factors as, for example, the particular mixture of ingredients employed, its initial viscosity and other such factors, but may be determined by observation of the increase in viscosity. Heating should continue until the viscosity begins to increase rapidly. A general rule for determining the heating time is to heat the mixture until the viscosity is about two to three times the initial viscosity.

After the bodying operation, the polymerization catalyst is added to the mixture and the whole is subjected to polymerization conditions. The use of liquid peroxides instead of solid peroxides is an advantage after bodying the resin mixture, since it is difficult to get the solid peroxides dissolved rapidly enough. Peroxides of coconut oil acids, tertiary-butyl peroxide and ascaridole are suitable liquid peroxides that may be employed. By the use of this process the induction period is reduced from approximately ½ to ⅛ that required when the bodying process is not used with liquid polymerizable compositions. Even greater reductions are obtained in the case of some compositions. Additional details with regard to the bodying of the more reactive polymerizable compositions are given, for example, in my aforementioned copending application Serial No. 555,194.

In many cases it is desirable to produce a polymerizable composition of a particular viscosity for a particular application. This may be done, for example, by partially polymerizing a triazine derivative of the kind embraced by Formula I, and then incorporating the partial polymer, e. g., a partial polymer of triallyl cyanurate, or a partial polymer of 2-amino-4,6-dialloxy-1,3,5-triazine, into a monomeric material which is copolymerizable therewith, e. g., a polymerizable polyalkyl ester of an unsaturated alpha, beta-polycarboxylic acid of the aliphatic series, more particularly a polyalkyl ester of an alpha, beta-unsaturated polycarboxylic acid, e. g., dimethyl fumarate, diethyl fumarate, etc., or a liquid unsaturated alkyd resin. In this way, the viscosity of the monomer conveniently may be increased to the point desired.

In some cases it is desirable to incorporate a polymerization inhibitor with the unsaturated material or into the composition comprising a mixture of monomeric or partially polymerized or unsaturated materials, especially those bodied compositions above described which otherwise have a relatively short storage life, since they will frequently polymerize even at room temperature within a comparatively short time. Moreover, when it is desired to cure such compositions very rapidly under heat and pressure, the reaction at times becomes so vigorous that it cannot be controlled. In order to overcome these difficulties it has been found advisable to incorporate a small proportion of a polymerization inhibitor in the polymerizable mixture. When it is desired to use this mixture, a small amount of a polymerization catalyst is added, sufficient to overcome the effect of the inhibitor as well as to promote the polymerization. By careful control of the concentrations of inhibitor and catalyst, a uniform product is obtainable with a good reaction velocity. Suitable polymerization inhibitors for this purpose are phenolic compounds, especially the polyhydric phenols, and aromatic amines. Specific examples of this group of inhibitors are hydroquinone, benzaldehyde, ascorbic acid, isoascorbic acid, resorcinol, tannin, sym. di - (beta - naphthyl) -p-phenylene diamine, phenolic resins, sulfur compounds, etc.

The concentration of the inhibitor is preferably low, and less than about 1% is usually sufficient. However, with the preferred inhibitors, e. g., polyhydric phenols and aromatic amines, I prefer to use only about 0.01 to about 0.1%.

The inhibitor may be incorporated into the polymerizable composition, either before or after bodying if the latter process is employed; or if an unsaturated alkyd resin, for example, is a component of the composition, it may be incorporated therein either before or during the preparation of the resin. By adding the inhibitor before the esterification, it is sometimes possible to use an inhibitor which would otherwise be substantially insoluble in the polymerizable composition. By adding the inhibitor to the unesterified mixture of resin-forming reactants, the inhibitor may become bound into the resin during the esterification process.

The preparation of unsaturated alkyd resins which may be used in preparing new copolymer compositions is illustrated in the following examples. All parts are by weight.

*Example 1*

Ninety-eight parts of freshly distilled maleic anhydride was reacted with about 10% in excess of equimolecular proportions of freshly distilled ethylene glycol (68 parts) at about 170-175° C. An excess of ethylene glycol is preferred because of its high volatility. The mixture is continuously agitated and carbon dioxide is introduced into the reaction chamber during the reaction thereby blanketing the surface of the reactants. After eight to twelve hours a clear, water-white resin is produced with an acid number of 35-50.

*Example 2*

Diethylene glycol (106 parts) and maleic anhydride (98 parts) were separately vacuum distilled into a reaction chamber which had been used in previous preparation, and the mixture was stirred mechanically while carbon dioxide gas was introduced over the surface of the resin to exclude air and to remove water that was formed in the esterification. The reaction was conducted at 170° C. for a period of from eight to twelve hours yielding a resin of acid number of 35-50.

*Example 3*

Twelve hundred parts of maleic anhydride was mixed with 1023 parts of alpha propylene glycol (equivalent to one mol of each plus approximately 10% of the glycol). This mixture was heated with agitation in an inert atmosphere at 150-165° C. After about four hours the resin turned opaque on cooling. After about eleven hours heating, a resin is obtained which is somewhat brittle at room temperature and the acid number is between 35 and 50.

*Example 4*

| | Parts |
|---|---|
| Diethylene glycol | 530 |
| Fumaric acid | 638 |
| Benzyl alcohol | 162 |

These substances are heated together at a temperature of 180° C. for about 7 hours during which time a small amount of benzyl alcohol distills over with the water of esterification. The benzyl alcohol-water thus obtained may be fractionated and the benzyl alcohol recovered for use in subsequent resin preparations. The resin has an acid number of 49.

*Example 5*

| | Parts |
|---|---|
| Fumaric acid (5.5 mols) | 638 |
| Diethylene glycol (5 mols) | 530 |
| Tetrahydroabietyl alcohol (1 mol) | 292 |

The fumaric acid and diethylene glycol are charged into a resin kettle together with 146 parts of alcohol. The resulting mixture is heated for about 4 hours at 180° C., after which the remainder of the alcohol is added and the reacting mixture is heated to about 200° C., and maintained at that point for about 1.5 hours. During the reaction about 175 parts of water is freed and distilled off, and the resin obtained has an acid number of about 49.

*Example 6*

| | Parts |
|---|---|
| Diethylene glycol | 106 |
| Fumaric acid | 116 |
| Tetrahydroabietyl alcohol | 73 |
| Linseed oil fatty acids | 70 |

These substances are heated to about 180° C., for about 8 hours under an atmosphere of carbon dioxide to obtain a resin having an acid number of about 42.

*Example 7*

| | Parts |
|---|---|
| Fumaric acid | 580 |
| Ethylene glycol | 310 |
| Omega-hydroxydecanoic acid | 188 |

These substances are heated to about 180° C., for 3 hours, after which the temperature is raised to about 190-200° C. for a period of 5 hours until the reaction mass has an acid number of about 50. Upon cooling to room temperature and allowing the resin to stand it slowly crystallizes, and this may be made more rapid by the addition of a small portion of an aromatic hydrocarbon.

*Example 8*

| | Parts |
|---|---|
| Fumaric acid | 170 |
| Diethylene glycol | 132.5 |
| Linseed oil fatty acid monoglycerides | 89 |

These substances are heated under an atmosphere of carbon dioxide for about 9 hours at 180° C. during which time about 44 parts of water distills off, whereby a resin having an acid number of about 64 is obtained.

*Example 9*

Ninety-eight parts of maleic anhydride (vacuum distilled), 106 parts of diethylene glycol (vacuum distilled), about 175 parts ethylene dichloride and about 3 parts d-camphor sulfonic acid were mixed in a reaction chamber. The heating was conducted in an oil bath maintained at 130°–145° C. for nine hours. The distillation temperature began at about 90° C. but gradually rose during the heating. The apparatus was so arranged that the water would be separated from the reflux. A light yellow resin with an acid number of about 19.8 was produced after driving off the volatile ingredients including the ethylene dichloride.

Similar results were obtained using thymol sulfonic acid and approximately the same proportions except that only about 148 parts of ethylene dichloride were used. A resin of acid number of 11.3 was obtained.

The resins prepared in the manner illustrated above are merely exemplary of the reactive resins which I contemplate using for reaction with a compound of the kind embraced by Formula I alone or with another monomeric material copolymerizable therewith, e. g., a different compound containing a $CH_2=C<$ grouping, in the practice of my invention. Other resins of the same type may be prepared in a similar manner.

Among these resins the following may be employed in place of part or all of those mentioned above: ethylene glycol fumarate, diethyl glycol fumarate, alpha propylene glycol maleate, polyethylene glycol maleates, (e. g., hexaethylene glycol maleate), polymethylene glycol maleates (e. g. decamethylene glycol maleate), octadecandiol fumarate, the maleic esters of: 2,2-dimethyl propanediol-1,3, glycerol maleate undecylenate, triethylene glycol chlormaleate, and triethylene glycol terpene maleate (derived from the interaction of ½ mol of terpene and 1 mol of maleic in the presence of an excess of terpene).

Many different modified alkyd resins may be employed in the same manner as the other resins mentioned herein. Such modified resins include all of those previously mentioned, and generically described, modified with a monohydric alcohol or with a monocarboxylic acid or with both a monohydric alcohol and a monocarboxylic acid. Among the alcohols which may be used are n-butanol, 1,2- and 1,3-dichloropropanols

(HO—CH$_2$—CHCl—CH$_2$Cl and

CH$_2$Cl—CHOHCH$_2$Cl)

the amyl alcohols, cyclohexanol, n-hexanol, 2-methyl hexanol, n-octanol, decanol, dodecanol, tetradecanol, cetyl alcohol, octadecanol, reduced geraniol, reduced fatty oils such as coconut oil, palm oil, etc., benzyl alcohol, phenylethyl alcohol, furfuryl alcohol, tetrahydrofurfuryl alcohol, and various ether alcohols such as

CH$_2$Cl—CHOH—CH$_2$—O—phenyl

phenyl—O—CH$_2$—CHOH—CH$_2$—O—phenyl

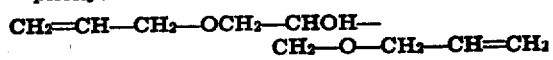
CH$_2$=CH—CH$_2$—OCH$_2$—CHOH—
    CH$_2$—O—CH$_2$—CH=CH$_2$ and those sold under the trade names of "Cellosolve" and "Carbitol," such as butyl "Cellosolve" (the monobutyl ether of ethylene glycol), butyl "Carbitol" (the monobutyl ether of diethylene glycol), etc. Furthermore, various monohydric alcohols may be reacted with glycidol and the reaction products thereof employed as a glycol in the preparation of the unsaturated alkyd resins. Of the cycloaliphatic alcohols, those derived by reaction of dienes with unsaturated aldehydes and thereafter reduced, such as isohexyl cyclohexyl carbinol, which is obtained by the reaction of beta-myrcene with acrolein and thereafter reduced, are especially suitable. Various acids and other compounds having esterifiable hydroxyl groups may be employed in the modification of the unsaturated alkyd resins to be used in accordance with my invention for copolymerization with other compounds. Thus for example, the hydroxy acids may be employed, including lactic acid, alpha-hydroxy-isobutyric acid, hydracrylic acid, omega-hydroxycaproic acid, omega-hydroxy-decanoic acid, omega-hydroxymyristic acid, etc. Other substances containing hydroxyl groups which may be used are, for example, ethylene cyanohydrin. Still other alcohols which may be employed are terpineol, fenchyl alcohol, the unsaturated alcohols, including allyl alcohol, methallyl alcohol, oleyl alcohol, linoleyl alcohol. I have found that copolymers of alkyd resins modified with monohydric alcohol give especially high temperature resistance when employed as a bond to laminate glass cloth or when glass fibers are used as a filler in castings or moldings.

It is preferable that primary alcohols be used as modifiers for the unsaturated alkyd resins and it is also preferable that the alcohols have boiling points above about 200° C. If low boiling alcohols, e. g., tetrahydrofurfuryl alcohol, be used it is preferable that the resin be prepared azeotropically (see Example 9) as described more fully hereafter.

Since the viscosity of the resin frequently becomes quite high if the esterification is carried to a low acid number, it may be desirable to produce the resin under azeotropic conditions. Accordingly, the esterification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone, although some of these may tend to darken the resin. The mixture is refluxed in such a manner as to separate the water formed by the esterification. Lower temperatures generally are used than are used under the conditions outlined in Examples 1-8. Suitable temperatures range, for example, between 90 and 145° C. for the lower boiling members of the group of solvents set forth above. Obviously, this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, naphthalene sulfonic acid and p-toluene sulfonic acid. Obviously other known esterification catalysts could be used. A resin having any particular acid number, if made azeotropically, will usually have a lower viscosity than one of the corresponding acid number not made azeotropically.

Monocarboxylic acids which are saturated may be employed as modifiers for the unsaturated monocarboxylic acids heretofore mentioned. Such acids include acetic acid, caproic acid, lauric acid, stearic acid, etc. Any of the monocarboxylic acids which are available in the form of the anhydride may be used as the anhydride instead of as the acid.

In order that those skilled in the art better may understand how to prepare my new compositions, the following examples are given by way of illustration and not by way of limitation. All parts are by weight.

Example 10

| | Parts |
|---|---|
| 2-amino-4,6-dialloxy-1,3,5-triazine | 100 |
| Benzoyl peroxide | 5 | were mixed and heated at about 110° C. A vigorous reaction occurred within a few minutes, and a hard polymeric mass was obtained upon heating for a short additional period.

Example 11

| | Parts |
|---|---|
| 2-amino-4,6-dialloxy-1,3,5-triazine | 30 |
| Diethylene glycol fumarate sebacate | 70 |
| Benzoyl peroxide | 1 |

Note.—This unsaturated alkyd resin was prepared by effecting reaction between 6 mols diethylene glycol, 5 mols fumaric acid and 1 mol sebacic acid.

The above ingredients were mixed and warmed to effect solution. A hard, well-cured copolymer was obtained by heating the resulting polymerizable composition for 1 hour at 100° C.

Example 12

| | Parts |
|---|---|
| 2-amino-4,6-dialloxy-1,3,5-triazine | 200.0 |
| Diethylene glycol fumarate sebacate prepared as described under Example 11 | 100.0 |
| Benzoyl peroxide | 1.5 | were mixed and heated together for 1½ hours at 100° C. A hard, well-cured copolymer was obtained.

Example 13

| | Parts |
|---|---|
| 2-amino-4,6-dialloxy-1,3,5-triazine | 100.0 |
| Benzoyl peroxide | 0.5 | were mixed and heated together at 100° C. After heating for only about 10 to 15 minutes a polymer in the form of a gel was obtained.

Example 14

| | Parts |
|---|---|
| 2-amino-4,6-dialloxy-1,3,5-triazine | 40 |
| Diethyl fumarate | 60 |
| Benzoyl peroxide | 1 | were mixed and heated together for 2 hours at 100° C., yielding a hard copolymer.

Example 15

| | Parts |
|---|---|
| 2-amino-4,6-dialloxy-1,3,5-triazine (M. P. 60-61° C.) | 40 |
| Ethylene glycol fumarate (crystalline) | 60 |
| Benzoyl peroxide | 1 |

The dry ingredients were blended together to form a molding composition, which is substantially stable upon storage for reasonable periods of time. Clear, hard, well-molded articles were obtained by molding samples of this composition for 15 minutes at 140° C. under a pressure of 5 pounds per square inch or for 10 minutes at the same temperature under a pressure of 30 pounds per square inch.

Various fillers, e. g., alpha-cellulose, asbestos, powdered silica, chopped cloth, etc., may be incorporated into the molding composition to yield molded articles of increased strength.

Example 16

Same as Example 15 with the exception that 60 parts crystalline neopentyl glycol fumarate was used instead of 60 parts crystalline ethylene glycol fumarate. Clear, hard, well-molded articles were obtained by molding the mixed ingredients for 10 minutes at 150° C. under a pressure of 30 pounds per square inch.

Example 17

| | Parts |
|---|---|
| 2-amino-4,6-dialloxy-1,3,5-triazine | 250.0 |
| Benzoyl peroxide | 7.5 |

Six plies of alpha-pulp paper, 10 mils thick, were coated and impregnated with the catalyzed triazine warmed to about 52°-58° C. The impregnated sheets were superimposed, and laminated together by heating between glass plates at contact pressure for 1 hour at 100° C. A hard, rigid laminated article was obtained.

Example 18

A piece of cast diethylene glycol fumarate sebacate-styrene copolymer capable of undergoing further copolymerization was abraded with emery paper, and the abraded surface was then coated with 2-amino-4,6-dialloxy-1,3,5-triazine having incorporated therein 2% by weight thereof of benzoyl peroxide. The film was cured in contact with a glass sheet by heating for 1¼ hours at 100° C. The Barcol hardness of the coated surface after cooling to room temperature average about 21.4, while the opposite side which was untreated had a Barcol hardness averaging about 13. After heating for an additional 16 hours at 100° C. the coated surface had a Barcol hardness averaging about 30, while the hardness of the untreated surface averaged only about 23. This shows that the 2-amino-4,6-dialloxy-1,3,5-triazine caused a definite improvement in the surface hardness of the copolymer treated therewith.

Example 19

| | Parts |
|---|---|
| 2-amino-4,6-dialloxy-1,3,5-triazine | 100 |
| Benzoyl peroxide | 1 | had a pale, straw color and a very slight haziness when mixed and melted. The molten mass was heated in a container first for 19 hours at 70° C. and then for 8 hours at 100° C. After heating for only 2½ hours at 70° C., the mass was very viscous. A clear casting, light yellow in color, was obtained at the end of the polymerization period. It had a specific gravity of 1.328 and absorbed only 0.17% by weight of water upon immersion in boiling water for 30 minutes. No crazing was observed on standing at room temperature after this rigid test. The solid polymer chars and burns slowly when held in the flame but is self-extinguishing when removed from the flame.

Example 20

| | Parts |
|---|---|
| Styrene | 190 |
| 2-amino-4,6-dialloxy-1,3,5-triazine | 10 |
| Benzoyl peroxide | 1 | yielded a clear, viscous copolymer when heated together for 48 hours at 100° C.

Example 21

| | Parts |
|---|---|
| Styrene | 150 |
| 2-amino-4,6-dialloxy-1,3,5-triazine | 50 |
| Benzoyl peroxide | 1 | yielded a clear, hard, slightly yellow copolymer upon heating together for 144 hours at 100° C.

The copolymer swelled but did not dissolve when immersed in toluene for several days.

Example 22

| | Parts |
|---|---|
| Styrene | 190 |
| 2-alloxy-4,6-diamino-1,3,5-triazine | 10 |
| Benzoyl peroxide | 1 |

The first two ingredients were mixed and heated on a steam bath for 20 minutes and then filtered. A small amount of solid crystallized from the solution on cooling. One part of benzoyl peroxide was added to the solution, which was then reheated to dissolve the triazine derivative. The solution was heated in a stoppered container at 100° C. for 144 hours, yielding a solid copolymer.

Example 23

| | Parts |
|---|---|
| 2,5-dichlorostyrene | 150 |
| 2-alloxy-4,6-diamino-1,3,5-triazine | 50 | were mixed and copolymerized by heating for 72 hours at 100° C. The resulting solid copolymer swelled but did not dissolve when immersed in toluene for several days.

Example 24

| | Parts |
|---|---|
| Styrene | 190 |
| Triallyl cyanurate | 10 |
| Benzoyl peroxide | 1 | were mixed and copolymerized by heating for 48 hours at 100° C. A solid copolymer was obtained which swelled but did not dissolve when immersed in toluene for several days.

Example 25

| | Parts |
|---|---|
| Styrene | 150 |
| Triallyl cyanurate | 50 |
| Benzoyl peroxide | 1 | yielded a solid copolymer when mixed and copolymerized by heating for 72 hours at 100° C.

Example 26

| | Parts |
|---|---|
| 2-amino-4,6-dimethalloxy-1,3,5-triazine | 100 |
| Benzoyl peroxide | 2 | were heated together on a steam bath to effect solution of the benzoyl peroxide. The mass polymerized to solid state rapidly, but was further polymerized by heating for 1 hour at 85–90° C. and for 2 hours at 100° C. A translucent, brittle resin was obtained.

Example 27

| | Parts |
|---|---|
| 2-amino-4,6-dimethalloxy-1,3,5-triazine | 200 |
| Benzoyl peroxide | 4 |

The above composition was cast in the form of a ⅛-inch sheet, and cured between glass plates for 2 hours at constant pressure. A brittle, light-colored resin having good clarity was obtained.

Example 28

| | Parts |
|---|---|
| 2-amino-4,6-dimethalloxy-1,3,5-triazine | 370.0 |
| Benzoyl peroxide | 7.4 | were mixed and applied hot (above 85° C.) to two superimposed layers of preheated glass cloth placed on a preheated glass plate. The laminate was cured by heating between glass plates at contact pressure for 2½ hours at 100° C. The panel had good stiffness and an average Barcol hardness of 42.

Example 29

| | Parts |
|---|---|
| 2-amino-4,6-dialloxy-1,3,5-triazine | 45 |
| Ethylene glycol fumarate (crystalline) | 55 |
| Benzoyl peroxide | 1 |
| Cotton flock | 67 | were dry mixed and pebble-milled to form a molding (moldable) composition. A sample of the resulting molding compound was molded for 5 minutes at 125° to 130° C. under a pressure of about 50 pounds per square inch. A hard, tough, opaque, well-molded article having a Barcol hardness of 60 was obtained.

Example 30

| | Parts |
|---|---|
| 2-amino-4,6-dialloxy-1,3,5-triazine | 50 |
| Benzoyl peroxide | 1 | were mixed and melted, and then applied to a glass plate. The coated plate was baked for 1 hour at 100° C. A dry film having fairly good adhesion to the glass was obtained. A harder film was produced by baking for 2 hours at 100° C.

Example 31

| | Parts |
|---|---|
| Phthalic polyester of pentaerythritol and allyl alcohol | 40.0 |
| 2-amino-4,6-dialloxy-1,3,5-triazine | 40.0 |
| Benzoyl peroxide | 1.6 |

A warm mixture of the above ingredients was applied to a glass plate, after which it was baked for 1 hour at 100° C. A clear, fairly tough film was obtained. Baking for two hours at 100° C. gave a harder film.

Example 32

| | Parts |
|---|---|
| 2-amino-4,6-dialloxy-1,3,5-triazine | 100 |
| Xylene | 100 |
| Benzoyl peroxide | 3 | were heated together under reflux (bath temperature 130° C.) for 5 minutes. A white, solid phase began to separate in 2 or 3 minutes, and at the end of 5 minutes the mixture had been converted into a soft, opaque, white mass which was easily broken. A slurry was formed by admixing the soft mass with methanol, warming the mixture on a steam bath, filtering, and drying the resulting polymer. The dry, solid polymer was soft, white and powdery, and was insoluble in hot dioxane. The polymer was infusible. It charred without fusing when a sample of it was heated slowly in a test tube over a flame.

Example 33

| | Parts |
|---|---|
| Styrene | 145.5 |
| 2-amino-4,6-dialloxy-1,3,5-triazine | 4.5 |
| Benzoyl peroxide | 0.3 |
| 5% polyvinyl alcohol solution (medium viscosity) | 60.0 |
| Water | 790.0 |

The above ingredients were vigorously agitated in a reaction vessel provided with a reflux condenser for 26¾ hours under an atmosphere of $CO_2$, the temperature being raised gradually from 21° to 69° C. in the first 1¼ hours, thence to 90° C. in the next two hours. The resulting copolymer was in the form of somewhat transparent, irregularly shaped particles, about 1 to 3 mm. in size. It was strained through cheese cloth and washed to remove fines. The pellets were steeped in fresh water, starting with ice water, and then transferring the vessel containing the pellets to a steam bath. Heating was continued on the steam bath with several changes of fresh water until the supernatant liquid remained clear. The washed particles of copolymer were oven-dried for 24 hours at 65° to 70° C. and for another 24 hours at 90° C. under 27 to 30 inches of vacuum. The dry copolymer particles, alone or admixed with fillers, may be molded under heat and pressure to form various molded articles of manufacture of good color. The dry particles are almost completely soluble in toluene.

Example 34

| | Parts |
|---|---|
| 2-amino-4,6-dialloxy-1,3,5-triazine | 45.0 |
| Ethylene glycol fumarate (crystalline) | 55.0 |
| Wood flour | 66.7 |
| Benzoyl peroxide | 0.5 |

The above ingredients were mixed and dry blended by tumbling on rollers for several hours, compacted on small mixing rolls by three passes on cold rolls and sheeting out on the final pass. The rolls were at room temperature at the start, with no circulation of either steam or water, but tended to warm somewhat as processing progressed. On the final pass the warm sheet was soft and plastic as stripped from the rolls but became hard and stiff upon cooling. The sheets were broken to form a molding composition, a sample of which was molded for 5 minutes at 100° C. under a pressure of about 50 pounds per square inch. A hard, tough, molded article having a good surface appearance was obtained. It had a Barcol hardness of 35 to 40.

Similar results are obtained when pulverized mica (325 mesh) is substituted for wood flour in the above formula. The mica-filled molded articles likewise were hard and tough, the Barcol hardness ranging from 48 to 53.

Example 35

| | Parts |
|---|---|
| 2-amino-4,6-dialloxy-1,3,5-triazine | 120.0 |
| 2 - amino - 4 - butylamino - 6 - alloxy-1,3,5-triazine | 120.0 |
| Benzoyl peroxide | 4.8 |

The above ingredients, with the exception of the benzoyl peroxide, were mixed and melted by heating on a steam bath. The benzoyl peroxide was added to the filtered melt. The molten mass was cast in the form of a ⅛" x 3" x 3½" sheet between glass plates. The cast sheet was cured by heating for 6 hours at 100° C. A light yellow, clear, cast copolymer was obtained. This copolymer was soft while hot but became hard on cooling.

Example 36

| | Parts |
|---|---|
| Styrene | 141.0 |
| 2-amino-4,6-dialloxy-1,3,5-triazine | 7.5 |
| Ethylene glycol fumarate sebacate [1] | 1.5 |
| Benzoyl peroxide | 0.3 |
| Water | 850.0 |

[1] Note. This resin was prepared by reacting together 4 mols ethylene glycol, 3 mols sebacic acid and 1 mol fumaric acid.

The first four ingredients were mixed and then filtered before adding to the water. A homogeneous dispersion was formed, utilizing a Homorod device, which dispersion thereafter was transferred quickly to a 2-liter flask and stirring began. Polymerization was effected under an atmosphere of carbon dioxide at a temperature of about 90° C. At the end of 19½ hours of heating and stirring, the copolymer was obtained in the form of a coagulated mass.

Example 37

| | Parts |
|---|---|
| 2-amino-4,6-dialloxy-1,3,5-triazine | 180.0 |
| 2-alloxy-4,6-diamino-1,3,5-triazine | 60.0 |
| Benzoyl peroxide | 4.8 |

Campatibility of the above ingredients was obtained by heating a vessel containing the mixed ingredients in an oil bath at 185° C. for a few minutes. After filtering to remove impurities, 4.8 parts benzoyl peroxide was added to the mixture while it was being heated on a steam bath. When heated momentarily in a 180° C. oil bath, the melt in the vessel gelled and quickly underwent a vigorous exothermic copolymerization. After cooling, the copolymer was in the form of a hard, brittle somewhat porous mass.

Example 38

This example illustrates the differences in the polymerization tendencies of compounds embraced by Formula I, specifically 2-amino-4,6-dialloxy-1,3,5-triazine, and other allyl compounds, more particularly diallylphthalate.

Twenty-five parts each of 2-amino-4,6-dialloxy-1,3,5-triazine and of diallyl phthalate, each containing 2% by weight thereof of benzoyl peroxide, was placed in glass tubes, which were then heated in a 100° C. oil bath. The sample of the alloxy triazine started thickening after heating for 6 minutes and gelled within an additional minute. The polymerization then proceeded rapidly, as the gel changed to a hard resin within a few minutes. The diallyl phthalate did not start thickening until about 32 minutes had elapsed, and then gelled after an additional 3 minutes' heating. The diallyl phthalate gel hardened quite slowly, being still somewhat soft after 10 minutes' further heating, at which point heating was discontinued.

Example 39

| | Parts |
|---|---|
| Styrene (steam distilled) | 152 |
| 2-amino-4,6-dialloxy-1,3,5-triazine | 8 |

The initial mixture of the above ingredients was not perfectly clear, but became clear when filtered. Copolymerization was effected in a glass tube into which carbon dioxide had been introduced before stoppering the tube with a tinfoil-covered cork. The solution was clear and quite viscous after heating for 72 hours at about 45° C. Upon further heating for 168 hours at 100° C., a clear, solid copolymer was obtained which was colorless except for some yellowing at the upper surface.

Example 40

Samples of polymeric 2-amino-4,6-dialloxy-1,3-5-triazine were prepared by curing the monomer containing 2% by weight thereof of benzoyl peroxide between glass plates for 23 hours at 70° C. and 3 hours at 100° C. The cured samples were translucent and had Barcol hardness values ranging from 62 to 66. Gasoline, toluene, acetone, 2B alcohol, dioxane, butyl acetate, cyclohexanone, ethylene dichloride, ethylene glycol monoethyl ether had no effect upon these samples when immersed in the respective liquids for 4 months.

Water had no effect upon the polymer after 39 days' immersion and produced only a slight whitening after 4 months' immersion. The polymer also was resistant to attack by a 10% solution of NaOH when immersed therein for 12 days, but after 39 days' immersion the surface of the polymer was softened. Dilute nitric acid attacked the polymer after only 48 hours, immersion, while dilute hydrochloric and dilute sulfuric acids attacked it after 6 days. A sheet of the polymer of this example was also resistant to a burning cigarette when placed on the surface of the casting.

Example 41

One and five-tenths parts benzoyl peroxide was dissolved in 50 parts 2-amino-4,6-dialloxy-1,3,5-triazine which had been liquefied by warming to about 70–75° C. Two layers of glass cloth which had been preheated to 100° C. on a glass plate were then impregnated with the warm solution. After applying a cover sheet of cellophane and a second glass plate the laminate was cured for two hours at 100° C. at contact pressure. The resultant flat panel had a good finish, was very stiff and had a Barcol hardness of 66.

Six-tenths part benzoyl peroxide was dissolved in 30 parts 2-amino-4,6-dialloxy-1,3,5-triazine at 70° C. While still warm the solution was transferred to a glass cell and cured for 16 hours at 70° C. and then for 4½ hours at 100° C. The clear, cast sheet had a Barcol hardness of 70. The cured resin was rather difficult to ignite when held in a flame and was self-extinguishing when removed from the flame.

Example 42

Four-tenths part benzoyl peroxide was dissolved in 20 parts triallyl cyanurate. The solution was then transferred to a glass cell and cured by heating at 80° C. for 21½ hours and then at 100° C. for 5 hours. The resulting cast sheet was clear and had a yellowish color. It had a Barcol hardness of 66.

Example 43

Seven-tenths part benzoyl peroxide was dissolved in a solution containing (1) 100 parts of an unsaturated alkyd resin, more particularly diethylene glycol fumarate sebacate obtained by reaction of 6 mols diethylene glycol, 5 mols fumaric acid and 1 mol sebacic acid, and (2) triallyl cyanurate. Two layers of glass cloth were impregnated with the resin solution and then cured at contact pressure between glass plates for 3 hours at 100° C. The laminate obtained was quite stiff and had very good hardness.

Example 44

A molding composition was prepared from the following materials:

| | Parts |
|---|---|
| 2-amino-4,6-dialloxy-1,3,5-triazine | 75.0 |
| Mixture of 50% benzoyl peroxide and 50% triphenyl phosphate | 3.0 |
| Zinc stearate | 2.25 |
| Anthophyllite | 150.0 |

The above materials were dry blended in a mixing machine for 6 hours and then homogenized and compacted by several passes through mixing rolls. The sheeted composition was then ground to a size suitable for molding. A 5″ x ½″ x ½″ bar molded at 250° F. for 10 minutes under 500 p. s. i. pressure had a Barcol hardness of 50.

Example 45

A molding composition was prepared from the following materials:

| | Parts |
|---|---|
| 2-amino-4,6-dialloxy-1,3,5-triazine | 45.0 |
| Ethylene glycol fumarate (crystalline) | 55.0 |
| Mixture of 50% benzoyl peroxide and 50% triphenyl phosphate | 2.0 |
| Hydroquinone | 0.01 |
| Zinc stearate | 2.5 |
| Anthophyllite | 150.0 |

All the ingredients except the filler were first dry blended, and the blend was then mixed with the filler and blending continued in a mixing machine until the mixture had fluxed to a heavy dough-like consistency and was somewhat warm. This required about 2½ hours.

The composition was then cooled down and ground to a size suitable for molding. A 5″ x ½″ x ½″ bar molded at 255° F. and 6 tons pressure for 10 minutes was hard and tough. It had a Barcol hardness of 60 and outstanding arc resistance, more particularly an arc resistance of 208 seconds.

Example 46

| | Parts |
|---|---|
| Diethylene glycol fumarate sebacate prepared as described under Example 11 | 700 |
| Triallyl cyanurate | 150 |
| Styrene (inhibitor-free) | 150 |
| Benzoyl peroxide | 5 | were mixed and warmed on a steam bath to insure complete solution of the peroxide catalyst. A 2-ply laminated article was made by curing between glass plates two superimposed sheets of glass cloth impregnated with the above polymerizable composition for 2 hours at 120° C. and at contact pressure. The laminate was completely cured, hard, compact, glossy, transparent and flexible. The copolymer of diethylene glycol fumarate sebacate, triallyl cyanurate and styrene, which was produced in situ, filled the interstices of glass cloth.

Example 47

| | Parts |
|---|---|
| Diethylene glycol fumarate sebacate prepared as described under Example 11 | 700 |
| Triallyl cyanurate | 150 |
| Methyl methacrylate | 150 |
| Benzoyl peroxide | 5 |

The same procedure was followed as described under Example 46. A hard, compact, completely cured, glossy, transparent, flexible 2-ply laminated article was obtained.

Example 48

| | Parts |
|---|---|
| Diethylene glycol fumarate sebacate prepared as described under Example 11 | 700 |
| Triallyl cyanurate | 150 |
| Diallyl phthalate | 150 |
| Benzoyl peroxide | 5 | were mixed and warmed on a steam bath to insure complete solution of the peroxide catalyst. A single sheet of glass cloth was impregnated with the resulting solution. The impregnated sheet was cured between glass plates for 2 hours at 120° C. and at contact pressure. The resulting sheet, which contained a copolymer of diethylene glycol fumarate sebacate, triallyl cyanurate and diallyl phthalate between the interstices of the glass cloth, was completely cured, hard, compact, glossy, transparent and flexible.

It will be understood, of course, by those skilled in the art that my invention is not limited to the specific ingredients named in the above illustrative examples nor to the particular proportions given therein. Thus, instead of benzoyl peroxide, any other polymerization catalyst may be employed, numerous examples of which have been mentioned hereinbefore. Likewise, triazine derivatives other than those set forth in the examples may be employed. Thus, instead of the particular triazine derivative specified in each example I may use any other triazine derivative of the kind embraced by Formula I, examples of which are:

2-methalloxy-4,6-diamino-1,3,5-triazine
2-methyl-4-amino-6-alloxy-1,3,5-triazine
2-hydroxy-4,6-dialloxy-1,3,5-triazine
2-hydroxy-4-ethyl-6-methalloxy-1,3,5-triazine
2-methoxy-4,6-dialloxy-1,3,5-triazine
2 - butylamino - 4 - methoxy -6- (2'-butenyloxy) - 1,3,5-triazine
2-methylamino-4,6-dimethalloxy-1,3,5-triazine
2 -(2' - decenyloxy)-4,6-di-(methylamino)-1,3,5-triazine
2-alloxy-4,6-dianilino-1,3,5-triazine
2-tolyl-4,6-dimethalloxy-1,3,5-triazine
2-ethalloxy-4,6-diethoxy-1,3,5-triazine
2-alloxy-4,6-dibutyl-1,3,5-triazine
2-propalloxy-4,6-dihydroxy-1,3,5-triazine
2-alloxy-4,6-dimethalloxy-1,3,5-triazine
2-phenyl-4,6-dialloxy-1,3,5-triazine
2-chloroanilino-4,6-dialloxy-1,3,5-triazine
2-methyl-4,6-dimethalloxy-1,3,5-triazine
Triethallyl cyanurate
Tri-(2-butenyl) cyanurate
Tri-(3-methyl-2-butenyl) cyanurate
Tri-(2-hexenyl) cyanurate
Tri-(2-decenyl) cyanurate Other examples will be apparent to those skilled in the art from the second and third paragraphs of this specification and from the examples of unsaturated alcohols and halogenotriazines given in the aforementioned copending Dudley application Serial No. 700,840.

The polymerizable compositions of this invention comprising a mixture of compatible, copolymerizable ingredients of the kinds hereinbefore described have a wide variety of applications. For instance, with or without a filler, they may be used in the production of molding compositions and molded articles; as the binder in the production of laminated articles; as coating compositions for use in finishes for wood, metals, plastics, etc., or in the treatment of fibrous materials, e. g., paper, cloth, leather, etc.; as impregnants for fibrous materials, as electrically insulating compositions, etc. They are especially suitable for use in the manufacture of laminated articles. A fibrous material, e. g., paper or sheets of cloth, asbestos, etc., is impregnated with the polymerizable material in liquid state. The dried, impregnated sheets are superimposed and bonded together under heat, e. g., at 40°-200° C. and pressure, for instance at pressures ranging from contact pressure up to 4000-5000 lbs. per square inch depending upon the particular composition employed. For many purposes where high strength materials are required, glass cloth is especially suitable for the production of laminates, but other fibrous materials may be employed in addition to those aforementioned, e. g., those composed of or comprising cellulose esters (e. g., cellulose acetate), regenerated cellulose fibers, rayons, synthetic fibers, for instance nylon, polyacrylonitrile fibers, vinylidene chloride polymeric compositions such as those sold under the trade name of "Saran," etc. They also may be used in various electrically insulating applications, e. g., as coil impregnants.

These new polymers and copolymers also are particularly useful in the production of molded articles. The compositions may be employed alone or admixed with a filler, dye, pigment, opacifier, lubricant, etc. Among the fillers that may be employed are alpha-cellulose pulp, asbestos fibers, cotton flock, chopped cloth cuttings, glass fibers, wood flour, mica dust, sand, clay, diatomaceous earth, etc.

The solid, substantially non-tacky polymerizable compositions of this invention, e. g., those obtained by admixing a crystalline polymerizable unsaturated alkyd resin with a solid monomer embraced by Formula I, may also be applied in molten form by the so-called hot-melt process. The resin may be applied in molten form either by spraying, dipping, calendering or other suitable means. The normally liquid monomers and mixtures thereof likewise may be used in coating and impregnating applications using conventional technique.

The polymerizable compositions of this invention also may be employed in the production of castings. They also may be used as adhesives, for instance in the production of optical devices containing a plurality of elements, examples of which are compound lenses, compound prisms, Nicol prisms, etc.

Natural or other synthetic resins and other modifiers may be incorporated into the polymeric and copolymeric compositions of this invention in order to modify the latter and to obtain products which may be especially suited for a particular service application. Examples of such modifying agents are shellac, ester gums, cellulose esters and ethers, urea-aldehyde resins, aminotriazine-aldehyde resins (e. g., melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, conventional alkyd resins of the nonpolymerizable type, etc. The polymers and copolymers of this invention also may be modified by incorporating therewith rubber or synthetic rubber-like products.

What I claim as new and desire to secure by Letters Patent of the United States is:

1. A polymerizable composition comprising (1) a compound represented by the general formula

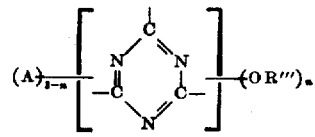

where A represents a monovalent radical selected from the class consisting of (a) monovalent saturated aliphatic, aromatic and nuclearly halogenated aromatic hydrocarbon radicals, (b) radicals represented by the formula —NRR' where R and R' each represents a member of the class consisting of hydrogen, monovalent saturated aliphatic hydrocarbon radicals and monovalent aromatic and nuclearly halogenated aromatic hydrocarbon radicals and (c) radicals represented by the formula —OR'', where R'' has the same meaning as R and R', R''' represents a monovalent hydrocarbon radical corresponding to the aliphatic hydrocarbon grouping in the residue remaining after esterification of a primary, ethylenically unsaturated aliphatic, monohydric alcohol containing at least 3 and not more than 10 carbon atoms, and $n$ represents an integer which is at least 1 and not more than 3, and (2) an unsaturated alkyd resin compatible with the compound of (1) and copolymerizable therewith and which is obtained by reaction of ingredients comprising a polyhydric alcohol and an alpha, beta-unsaturated polycarboxylic acid.

2. A composition comprising the product of polymerization of a polymerizable mass including (1) a compound represented by the general formula

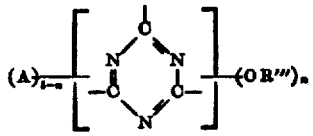

where A represents a monovalent radical selected from the class consisting of (a) monovalent saturated aliphatic, aromatic and nuclearly halogenated aromatic hydrocarbon radicals, (b) radicals represented by the formula —NRR' where R and R' each represents a member of the class consisting of hydrogen, monovalent saturated aliphatic hydrocarbon radicals and monovalent aromatic and nuclearly halogenated aromatic hydrocarbon radicals and (c) radicals represented by the formula —OR'' where R'' has the same meaning as R and R', R''' represents a monovalent hydrocarbon radical corresponding to the aliphatic hydrocarbon grouping in the residue remaining after esterification of a primary, ethylenically unsaturated aliphatic, monohydric alcohol containing at least 3 and not more than 10 carbon atoms, and $n$ represents an integer which is at least 1 and not more than 3, and (2) an unsaturated alkyd resin compatible with the compound of (1) and copolymerizable therewith and which is obtained by reaction of ingredients comprising a polyhydric alcohol and an alpha, beta-unsaturated polycarboxylic acid 3. A polymerizable composition comprising (1) a compound represented by the general formula

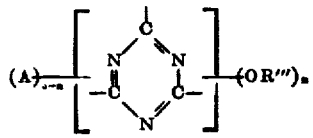

where A represents a monovalent radical selected from the class consisting of (a) monovalent saturated aliphatic, aromatic and nuclearly halogenated aromatic hydrocarbon radicals, (b) radicals represented by the formula —NRR' where R and R' each represents a member of the class consisting of hydrogen, monovalent saturated aliphatic hydrocarbon radicals and monovalent aromatic and nuclearly halogenated aromatic hydrocarbon radicals and (c) radicals represented by the formula —OR'' where R'' has the same meaning as R and R', R''' represents a monovalent hydrocarbon radical corresponding to the aliphatic hydrocarbon grouping in the residue remaining after esterification of a primary, ethylenically unsaturated aliphatic, monohydric alcohol containing at least 3 and not more than 10 carbon atoms, and $n$ represents an integer which is at least 1 and not more than 3, (2) a polymerizable unsaturated alkyd resin obtained by reaction of ingredients comprising a polyhydric alcohol and an alpha,beta-unsaturated polycarboxylic acid and (3) a polyallyl ester of a polycarboxylic acid, all of the said ingredients being copolymerizable.

4. A product comprising the polymerized composition of claim 3.

5. A composition comprising the product of polymerization of a polymerizable mass including (1) a cyanuric triester represented by the general formula

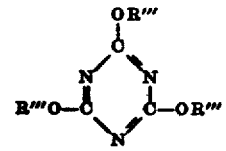

where R''' represents a monovalent hydrocarbon radical corresponding to the aliphatic hydrocarbon grouping in the residue remaining after esterification of a primary, ethylenically unsaturated aliphatic, monohydric alcohol containing at least 3 and not more than 10 carbon atoms and (2) an unsaturated alkyd resin compatible with the triester of (1) and copolymerizable therewith and which is obtained by reaction of ingredients comprising a polyhydric alcohol and an alpha, beta-unsaturated polycarboxylic acid.

6. A composition comprising the product of polymerization of a polymerizable mass including (1) triallyl cyanurate and (2) an unsaturated alkyd resin compatible therewith and obtained by reaction of ingredients comprising a polyhydric alcohol and an alpha, beta-unsaturated polycarboxylic acid.

7. A product comprising a copolymer of ingredients including (1) triallyl cyanurate, (2) diallyl phthalate and (3) an unsaturated alkyd resin obtained by reaction of ingredients comprising a dihydric alcohol and an alpha, beta-unsaturated dicarboxylic acid and which is compatible with the ingredients of (1) and (2).

8. The method of preparing new synthetic compositions which comprises polymerizing a mixture containing (1) a compound represented by the general formula

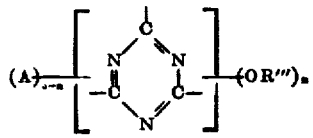

where A represents a monovalent radical selected from the class consisting of (a) monovalent saturated aliphatic, aromatic and nuclearly halogenated aromatic hydrocarbon radicals, (b) radicals represented by the formula —NRR' where R and R' each represents a member of the class consisting of hydrogen, monovalent saturated aliphatic hydrocarbon radicals and monovalent aromatic and nuclearly halogenated aromatic hydrocarbon radicals and (c) radicals represented by the formula —OR'' where R'' has the same meaning as R and R', R''' represents a monovalent hydrocarbon radical corresponding to the aliphatic hydrocarbon grouping in the residue remaining after esterification of a primary, ethylenically unsaturated aliphatic, monohydric alcohol containing at least 3 and not more than 10 carbon atoms, and $n$ represents an integer which is at least 1 and not more than 3, (2) an unsaturated alkyd resin compatible with the compound of (1) and copolymerizable therewith and which is obtained by reaction of ingredients comprising a polyhydric alcohol and an alpha,-beta-unsaturated polycarboxylic acid, and (3) a catalyst for accelerating the copolymerization of the ingredients of (1) and (2).

9. A composition comprising a polymer of triallyl cyanurate as an essential component thereof.

10. Polymeric triallyl cyanurate.

11. A clear sheet of polymeric triallyl cyanurate.

12. The method of preparing a new synthetic composition which comprises polymerizing triallyl cyanurate.

13. The method of preparing a new synthetic composition which comprises polymerizing triallyl cyanurate while admixed with a polymerization catalyst.

14. The method of preparing a new synthetic composition which comprises polymerizing triallyl cyanurate under heat while admixed with a polymerization catalyst.

15. The method of preparing a new synthetic composition which comprises polymerizing triallyl cyanurate under heat while admixed with a small amount of benzoyl peroxide.

16. The method of preparing a new synthetic composition which comprises polymerizing triallyl cyanurate while admixed with a small amount of benzoyl peroxide for a period of 21½ hours at 80° C. and then for a period of 5 hours at 100° C.

17. A polymerizable composition comprising triallyl cyanurate and a different compound which is copolymerizable with triallyl cyanurate and which contains a $CH_2=C<$ grouping.

18. A product comprising the polymerized composition of claim 17.

19. A polymerizable composition comprising styrene and triallyl cyanurate.

20. A copolymer of copolymerizable ingredients comprising styrene and triallyl cyanurate.

21. A copolymer of, by weight, from 10 to 50 parts of triallyl cyanurate and from 150 to 190 parts of styrene.

22. A polymerizable composition comprising methyl methacrylate and triallyl cyanurate.

23. A copolymer of copolymerizable ingredients comprising methyl methacrylate and triallyl cyanurate.

24. The method of preparing a new synthetic composition which comprises polymerizing a mixture of copolymerizable ingredients including triallyl cyanurate and a different compound which contains a $CH_2=C<$ grouping.

EDWARD L. KROPA.

REFERENCES CITED

The following references are of record in the file of this patent:

UNITED STATES PATENTS

| Number | Name | Date |
|---|---|---|
| 2,275,467 | Pollack et al. | Mar. 10, 1942 |
| 2,296,823 | Pollack et al. | Sept. 22, 1942 |
| 2,305,224 | Patterson | Dec. 15, 1942 |
| 2,306,440 | Hentrich et al. | Dec. 29, 1942 |
| 2,332,461 | Muskat et al. | Oct. 19, 1943 |